US008019780B1

(12) United States Patent
Pinkerton et al.

(10) Patent No.: US 8,019,780 B1
(45) Date of Patent: Sep. 13, 2011

(54) HANDLING DOCUMENT REVISION HISTORY INFORMATION IN THE PRESENCE OF A MULTI-USER PERMISSIONS MODEL

(75) Inventors: Michael Pinkerton, Ashburn, VA (US); Thomas E. Van Lenten, Ashburn, VA (US); Amanda E. Walker, Reston, VA (US); David MacLachlan, Morgan Hill, CA (US); Greg Miller, San Jose, CA (US); Alex B. Harper, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 380 days.

(21) Appl. No.: 11/731,662

(22) Filed: Mar. 30, 2007

(51) Int. Cl.
 *G06F 7/00* (2006.01)
 *G06F 17/30* (2006.01)
(52) U.S. Cl. ...................................................... 707/783
(58) Field of Classification Search .................. 707/203, 707/783, 785, 999.009
 See application file for complete search history.

(56) References Cited

U.S. PATENT DOCUMENTS

| | | | |
|---|---|---|---|
| 5,761,669 A * | 6/1998 | Montague et al. | 707/758 |
| 6,243,706 B1 * | 6/2001 | Moreau et al. | 1/1 |
| 6,327,584 B1 * | 12/2001 | Xian et al. | 1/1 |
| 7,031,954 B1 * | 4/2006 | Kirsch | 707/731 |
| 7,035,910 B1 * | 4/2006 | Dutta et al. | 709/217 |
| 7,529,778 B1 * | 5/2009 | Dewey et al. | 1/1 |
| 7,680,932 B2 * | 3/2010 | Defaix et al. | 709/225 |
| 7,698,379 B2 * | 4/2010 | Dutta et al. | 709/217 |
| 2004/0133444 A1 * | 7/2004 | Defaix et al. | 705/1 |
| 2004/0215672 A1 * | 10/2004 | Pfitzner | 707/203 |
| 2004/0215825 A1 * | 10/2004 | Pfitzner | 709/245 |
| 2004/0215826 A1 * | 10/2004 | Pfitzner | 709/245 |
| 2004/0216090 A1 * | 10/2004 | Kaler et al. | 717/121 |
| 2005/0091291 A1 * | 4/2005 | Kaler et al. | 707/203 |
| 2005/0125461 A1 * | 6/2005 | Filz | 707/203 |
| 2006/0101071 A1 * | 5/2006 | Henderson | 707/104.1 |
| 2006/0149831 A1 * | 7/2006 | Dutta et al. | 709/217 |
| 2007/0033654 A1 * | 2/2007 | Wilson | 726/27 |
| 2007/0220068 A1 * | 9/2007 | Thompson et al. | 707/203 |
| 2007/0288637 A1 * | 12/2007 | Layton et al. | 709/226 |

* cited by examiner

*Primary Examiner* — Mohammad Ali
*Assistant Examiner* — Patrick A Darno
(74) *Attorney, Agent, or Firm* — Park, Vaughan, Fleming & Dowler LLP

(57) ABSTRACT

One embodiment of the present invention provides a system that controls accesses to revisions of documents in the presence of a multi-user permissions and ownership model. During operation, the system receives a request to on behalf of a user to access a revision of a document. If the request is directed to a most-recent revision of an existing document, the system uses the multi-user permissions and ownership model to control access to the revision. Otherwise, if the request is directed to a previous revision of the document, the system grants access to the revision only if the user was the owner of the document at the time of the revision.

24 Claims, 5 Drawing Sheets

HANDLING DOCUMENT REVISION HISTORY INFORMATION IN THE PRESENCE OF A MULTI-USER PERMISSIONS MODEL

BACKGROUND

1. Field of the Invention

The present invention relates to techniques for controlling access to data within computer systems. More specifically, the present invention relates to a method and an apparatus for handling document revision history information in the presence of a multi-user permissions and ownership model.

2. Related Art

File systems generally provide sophisticated mechanisms for enforcing access rights to files. These mechanisms control the ability users to perform specific operations on files. For example, UNIX-based file systems provide permission mechanisms which allow specific users (or groups of users) to selectively: read, write or execute individual files.

These file-system-based permission mechanisms are generally effective for controlling accesses to current versions of existing files. However, in many situations it is desirable to be able to access data from previous revisions of files, or from files that have been deleted from the file system. These types of accesses can be facilitated by caching previous revisions of files. However, when users view previous revisions of files, it is important to ensure that users cannot view revisions that they did not have permission to view originally. This cannot be accomplished by simply caching permissions for files because advanced operating systems provide other mechanisms, such as Access Control Lists (ACLs) and kernel plug-ins, to perform permissions checks. These other mechanisms can change their decisions on a minute-by-minute basis and cannot be cached.

Hence, what is needed is a method and an apparatus for controlling accesses to cached revisions of documents without violating permissions.

SUMMARY

One embodiment of the present invention provides a system that controls accesses to revisions of documents in the presence of a multi-user permissions and ownership model. During operation, the system receives a request to on behalf of a user to access a revision of a document. If the request is directed to a most-recent revision of an existing document, the system uses the multi-user permissions and ownership model to control access to the revision. Otherwise, if the request is directed to a previous revision of the document, the system grants access to the revision only if the user was the owner of the document at the time of the revision.

In some embodiments, the request is received from a query processor, which can return previous and most-recent revisions of documents while processing a query.

In some embodiments, prior to receiving the request to access the revision of the document, the system receives a query containing terms from the user. In response to this query, the system looks up the terms in previous and most-recent revisions of the documents. If the terms in the query match terms in a revision of a document, the system requests access to the matching revision on behalf of the user. If access is granted, the system presents the matching revision to the user.

In some embodiments, upon receiving an additional revision for a document, the system stores the additional revision in data structures that contain document history information to facilitate subsequently looking up the additional revision.

In some embodiments, the additional revision is stored along with an identifier for the owner of the document at the time of the additional revision.

In some embodiments, the document comprises a sequence of events, wherein each event can be associated with a revision.

In some embodiments, a revision of the document can be: an initial version of the document; the most-recent revision of the document; or any other revision of the document.

In some embodiments, the permissions and ownership model is part of a file system which stores files containing documents, wherein each file in the file system is associated with an owner and a set of permissions.

In some embodiments, using the permissions and ownership model to control access to the revision involves examining permissions within the file system and also involves using one or more authorization modules, access control lists or plug-ins to authorize access to the revision.

DETAILED DESCRIPTION

Figure 1:
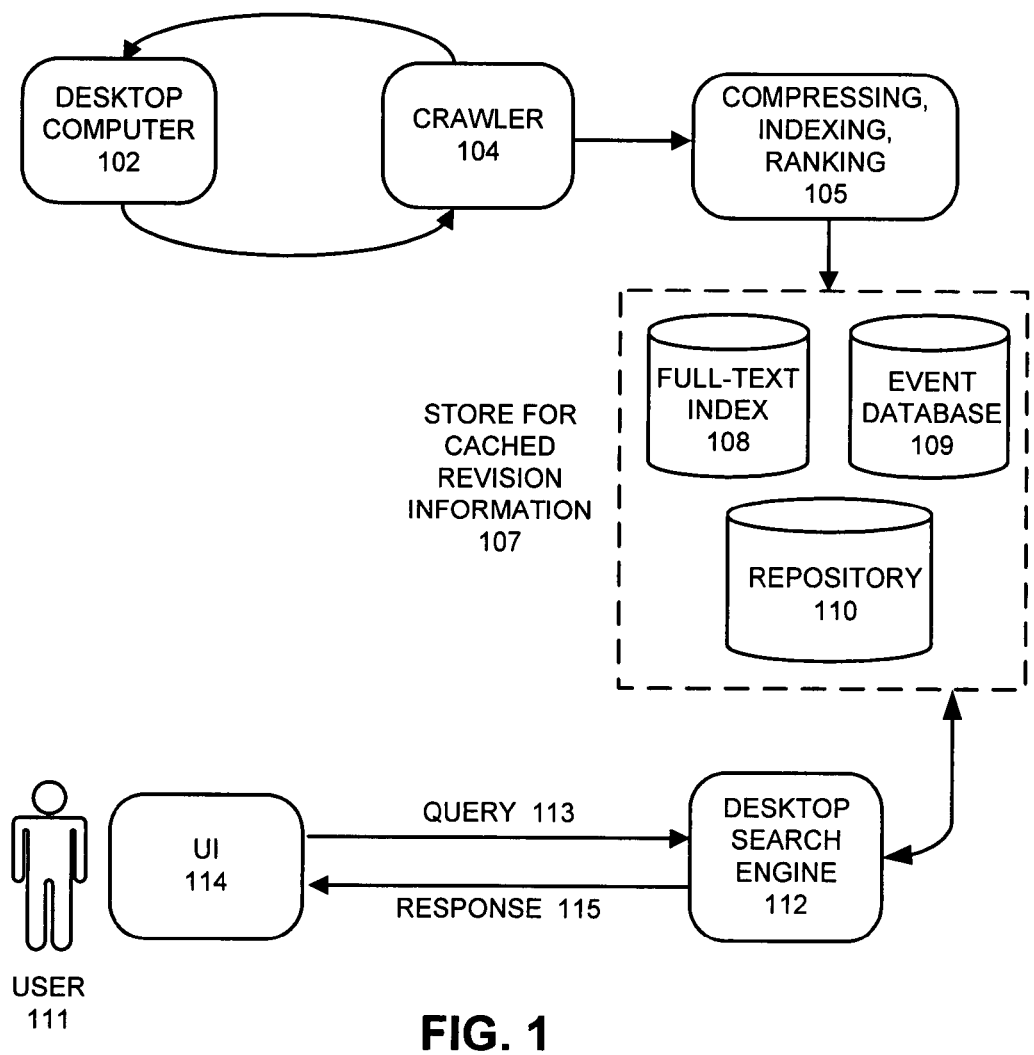
FIG. 1 illustrates a system that supports searching through cache revisions of documents in accordance with an embodiment of the present invention.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Rules for Handling Permissions

A major complication in designing a system that handles revisions is that in sophisticated operating systems we cannot cache permissions for past revisions, or for files that no longer exist on disk (for the reasons stated above). In order to solve this problem, one embodiment of the present invention uses the simple rule that only the owner of the file at the time of the revision (which is easy to cache and cannot be affected by ACLs or kernel authorization plugins) can see past revisions of the file, otherwise we defer to the existing file system permissions for the most-recent revisions of files.

This rule has a number of consequences. (1) A user who has never owned a document, but has read permissions for the on-disk file, can only see the most-recent revision of the file and not any previous revisions. (2) A user who previously owned a document can only see revisions from the time period that they owned the document, plus the current revision if they have read permission to the on-disk file. (3) The owner of the file cannot see revisions of documents before they became the owner, regardless of the previous file permissions. (4) Also, once a file has been deleted from disk, only past owners can see revisions, and again, only the revisions from the time period they owned the file.

Examples

We now describe how one embodiment of the present invention uses the above-described rule to handle a number of different situations. In the examples which follow, we assume there are at least two users on a machine, user A and user B. We also assume that the machine supports the UNIX™ permissions model, wherein files have both an "owner" and a set of permissions (owner/group/other), which allows permissions to be granted to users who are not the owner of a file.

Suppose user A creates a document in the file system and user B does not have permission to read it. In this case, we need to ensure that user B cannot see the most-recent revision of the file when browsing document history. Because we are dealing with the most-recent revision of a file, we defer to the UNIX file permissions, so user B does not have read permission to the on-disk file.

In another example, suppose user A creates a document and user B has permission to read it. In this case, we need to ensure that user B sees the most-recent revision of the file when browsing through the document history. Because we are again dealing with the most-recent revision of a file, we similarly defer to the UNIX file permissions, so user B has read permission and is able to see the most-recent revision.

Now suppose user A revises a document that user B can read and suppose that the document is still available on disk. In this case, user B can see the most-recent revision of the file (as above), but what about a previous revision? We cannot simply cache permissions at that the time of the previous revision, because advanced operating systems provide mechanisms, such as Access Control Lists (ACLs) and kernel plugins, which are called during permissions checks. These mechanisms can change their decisions on a minute-by-minute basis and can base their determinations on state information that cannot be cached. In this case, user B can see the most-recent revision, but since there is no way to "go back in time" to the time just before user A made the revision to check permissions, and because we cannot cache permissions, we allow past revisions to only be viewed by the owner at the time of the revisions, which is user A. Therefore, user B cannot see the past revision for which user A was the owner (even if user B had permission to access the file at the time of the revision).

In another example, suppose user A deletes a document that user B could read. In this case, we cannot determine who has permission to read the previous revisions because the file is no longer on disk and we consequently cannot use on-disk permission information to check authorization. Furthermore, we cannot go back in time to check the permissions before user A deleted the file, nor can we cache permissions. Hence, in this case only user A may see the revisions once the file has been deleted (with the exception of past revisions where user B was the file owner, see below).

In yet another example, suppose user A creates a document, and then revises the document a few times before changing the ownership of the document to user B. At some point, the ownership may even be transferred back to user A. Which revisions can each user see in the history? In this case, past revisions are only available to the owner of the document at the time, so user A can see the revisions for the time periods where user A owned the document, and User B can see the revisions for the time periods where user B owned the document.

Purging a Document

One embodiment of the present invention enables users to purge a document from the system. Purging involves fully removing revisions from the repository and database, and can be done for an individual revision or for the document as a whole (which deletes all events). Additionally, when a document is purged, no further events are collected for this document even if the document still exists on disk and is being modified. Purging a document is forever.

One embodiment of the present invention provides the following rules to govern who is allowed to purge the revision history. (1) The owner of the file (or the owner of the most-recent revision if the file was deleted on disk) can purge the entire document history. Even if the history contains revisions owned by others, the current owner has ultimate power to remove all revisions even though they cannot see them (as above). (2) A user who is not the owner of the file cannot remove any previous revision, even ones for which the user was the owner of the file. In practice, rule (2) could be changed to allow owners of previous revisions to purge them separately, but this complicates the user experience for very little gain.

We now describe how to implement a system that implements the above-described rules.

Search System

FIG. 1 illustrates a system that supports searching through cached revisions of documents in accordance with an embodiment of the present invention. To support this searching, the system can perform a number of processes, including: crawling, ranking, searching and permissions-checking processes. During the crawling process, a crawler 104 crawls or otherwise searches through desktop computer 102 to find documents and/or revisions of documents to be stored in indexed form in a store for cached revision information 107. The selected revisions are then compressed, indexed and ranked by module 105 before being stored within store 107.

During a subsequent search process, a desktop search engine 112 receives a query 113 from a user 111 through a user interface (UI) 114. For example, UI 114 can be a query box that appears on a screen for desktop computer system 102. The entered query 113 specifies a number of terms to be searched for in the set of revisions. In response to query 113, desktop search engine 112 uses terms in the query to identify highly-ranked documents and revisions that contain the terms. Search engine 112 then returns a response 115 through UI 114, wherein the response 115 identifies matching documents/revisions along with ranking information and provides references to the identified documents/revisions.

In one embodiment of the present invention, the store for cached revision information 107 contains: a full-text index 108, an event database 109 and a repository 110. Event database 109 stores metadata for indexable "events," wherein each event can be associated with a revision. Full-text index 108 contains a reverse index which allows revisions to be looked up based on terms contained in the revisions. For example, in one embodiment of the present invention full-text index 108 maps tokenized terms to a posting list of event identifiers for revisions that contain the terms. These event identifiers are used to key into the event database 109, which stores non-content attributes about the events. Note that metadata from event database 109 can be used to tie together references to events from full-text index 108 and associated text from repository 110. Repository 110 stores the text content of files and/or revisions that have been indexed. (It can also store other document-related assets, such as thumbnails or favicons.)

Figure 2:
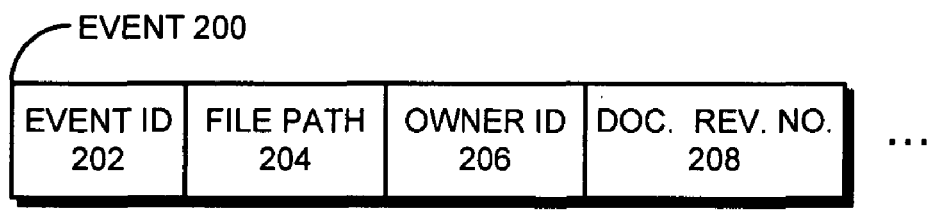
FIG. 2 illustrates a data structure for an event in accordance with an embodiment of the present invention.

One embodiment of the present invention represents documents as a sequence of revisions starting from an initial version of the document, wherein the revisions are represented as events. More specifically, FIG. 2 illustrates an exemplary data structure for an event 200 in accordance with an embodiment of the present invention. As illustrated in FIG. 2, event data structure 200 includes an event identifier 202, which is a globally unique identifier for the event. It also includes a file path 204 which identifies a file associated with the event. Event data structure 200 also includes an owner ID 206, which identifies the owner for the event and a document revision number 208, which specifies which revision of the file the event is associated with.

Figure 3:
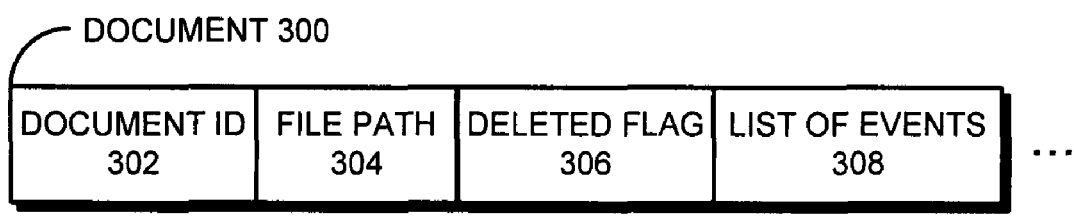
FIG. 3 illustrates a data structure for a document in accordance with an embodiment of the present invention.

As mentioned above, each document is represented as a sequence of events. More specifically, FIG. 3 illustrates an exemplary data structure for a document 300 in accordance with an embodiment of the present invention. This data structure includes a document identifier 302, which uniquely identifies the document and also a file path 304, which specifies the location for the file. Document data structure 300 also includes a deleted flag 306 which specifies whether the document has been deleted. It also includes a list of events 308, wherein the events in the list are associated the revisions. (Note that data structures for documents and events can be stored within event database 109 illustrated in FIG. 1).

Figure 4A:
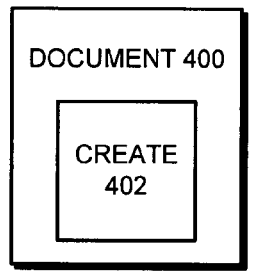
FIG. 4A illustrates a data structure for a document which includes one event in accordance with an embodiment of the present invention.
Figure 4B:
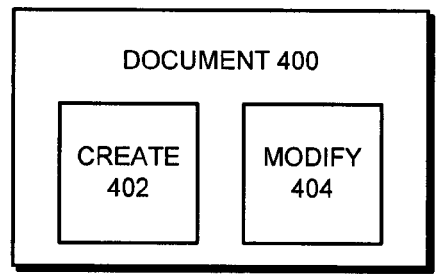
FIG. 4B illustrates a data structure for a document which includes two events in accordance with an embodiment of the present invention.
Figure 4C:
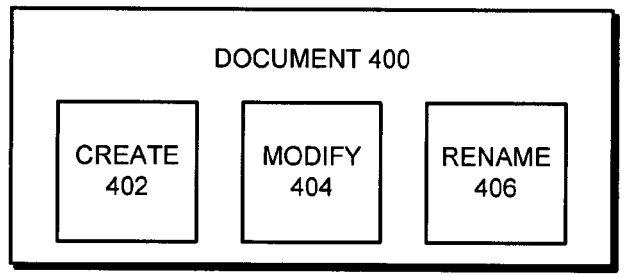
FIG. 4C illustrates a data structure for a document which includes three events in accordance with an embodiment of the present invention.
Figure 4D:
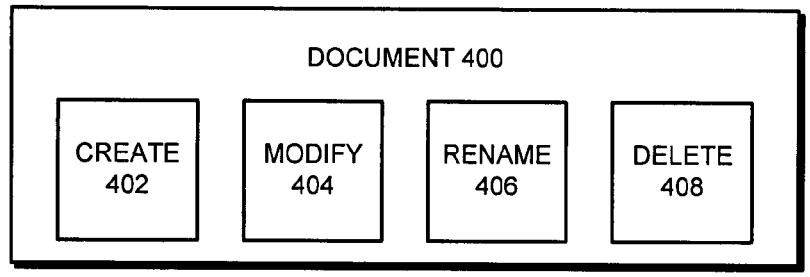
FIG. 4D illustrates a data structure for a document which includes four events in accordance with an embodiment of the present invention.

FIGS. 4A-4C illustrate how a document 400 is comprised of a sequence of events. More specifically, FIG. 4A illustrates an initial version of a document, which includes a create event 402. For example, this document can be created with the command "$echo hi>foo.txt", where "foo.txt" is the name of the document. Next, the document can be modified by using the command "$ echo bye>foo.txt", which adds the modify event 404 to document 400 as is illustrated in FIG. 4B. The document is then renamed by using the command "$ my foo.txt bar.txt", which adds the rename event 406 to document 400 as is illustrated in FIG. 4C. Finally, the document is deleted by using the command "$ rm bar.txt", which adds the delete event 408 to document 400 as is illustrated in FIG. 4C. (Alternatively, in one embodiment of the present invention, the delete command simply sets the deleted flag 306 for the document 300 instead of adding an additional event to the list of events 308 for document 300.)

Performing a Query

Figure 5:
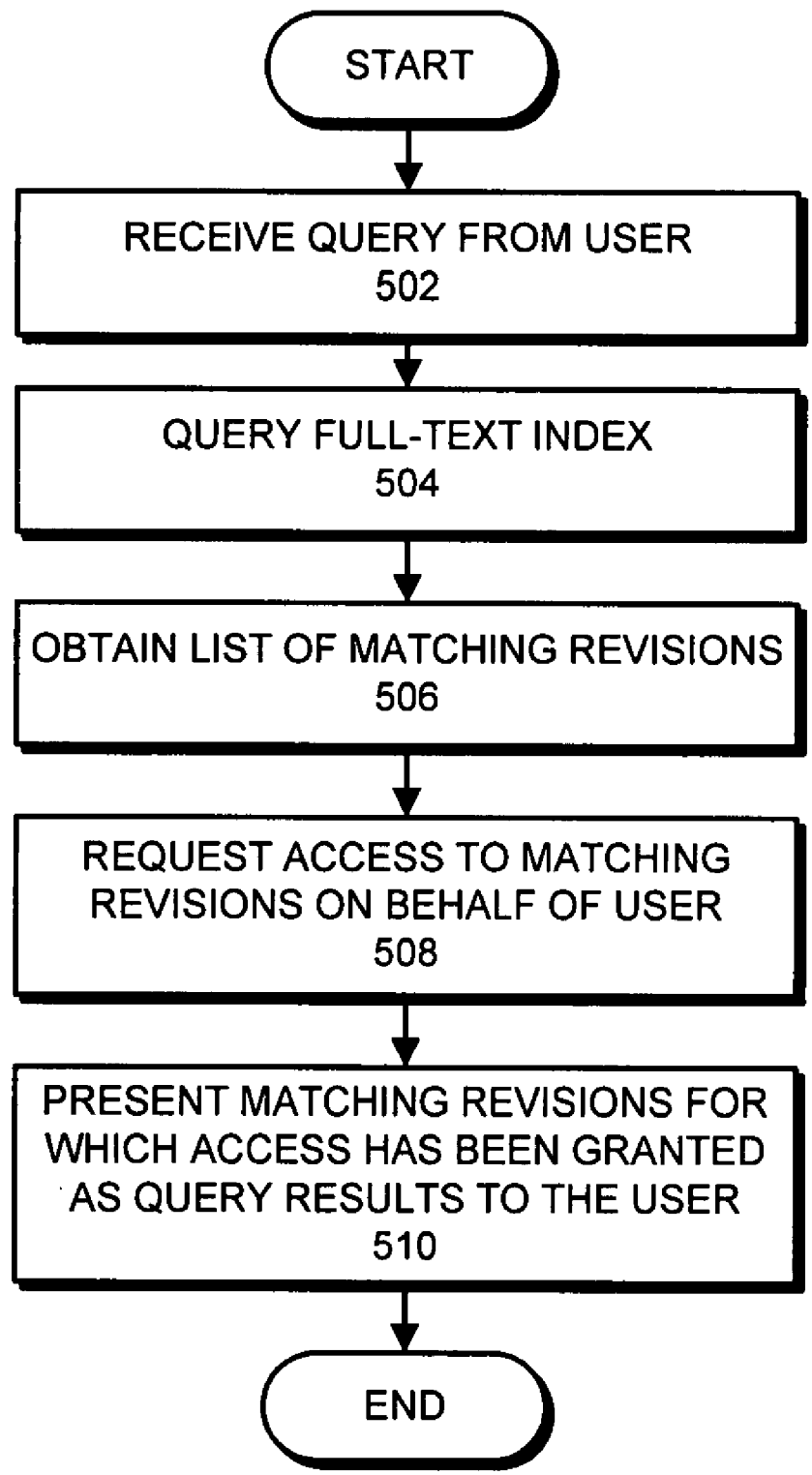
FIG. 5 presents a flow chart illustrating the process of performing a query on document revisions in accordance with an embodiment of the present invention.

FIG. 5 presents a flow chart illustrating the process of performing a query on document revisions in accordance with an embodiment of the present invention. During this process, the system first receives a query containing terms from the user (step 502). Next, while processing the query, the system looks up the terms in full-text index 108 (step 504), which contains previous and most-recent revisions of the documents. This produces list of matching revisions (if there are any) (step 506). Next, the system requests access to the matching revisions on behalf of the user (step 508). The system then presents the matching revisions for which access has been granted to the user (step 510).

Controlling Access to a Revision

Figure 6:
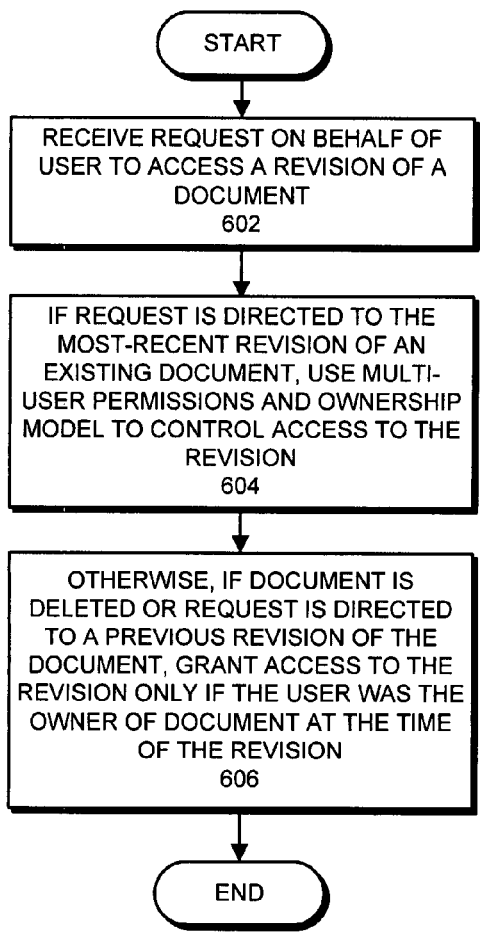
FIG. 6 presents a flow chart illustrating the process of controlling an access to a revision of a document in accordance with an embodiment of the present invention.

FIG. 6 presents a flow chart illustrating the process of controlling an access to a revision of a document in accordance with an embodiment of the present invention. During this process, the system first receives a request on behalf of a user to access a revision of a document (step 602). (Note that this request can occur during while processing a query for the user as is discussed above.) If the request is directed to the most-recent revision of an existing document, the system uses the existing multi-user permissions and ownership model of the file system to control access to the revision (step 604). Otherwise, if the document is deleted or the request is directed to a previous revision of the document, the system grants access to the revision only if the user was the owner of the document at the time of the revision (step 606). Note that this is a conservative restriction, which may prevent some users from accessing revisions that they could have accessed at the time the revisions where made.

However, as noted above, it is not possible to simply cache historic permissions because advanced operating systems often use sophisticated permissions-checking mechanisms, such as ACLs and kernel plug-ins. Hence, it is not possible to perform all of the permission checks that could have been performed at the time of the revision. The owner of the file at the time of the revision was certainly able to access the revision at the time the revision was made, which means that the permissions that existed at the time of the revision will not be violated by allowing the owner of the file at the time of the revision to access the file. Moreover, it is a simple matter to keep track of the owner of the file at the time of the revision by recording an owner ID 206 in each event data structure.

Figure 7:
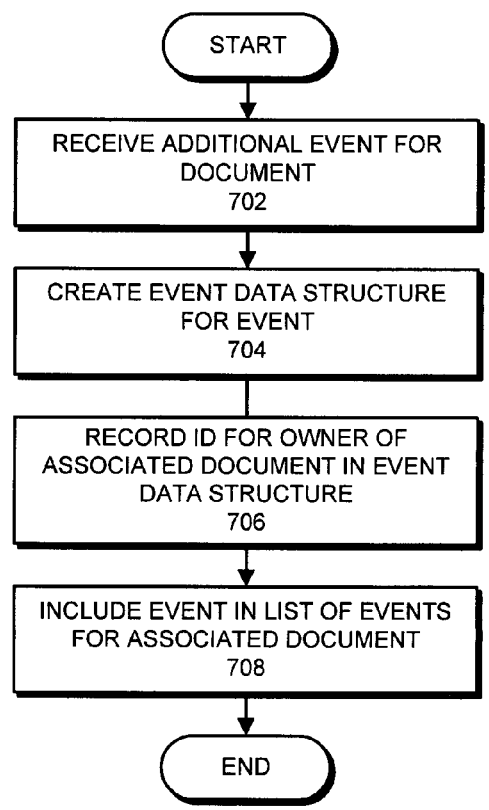
FIG. 7 presents a flow chart illustrating the process of storing an additional event for a document in accordance with an embodiment of the present invention.

For example, referring to FIG. 7, an owner ID can be recorded in an event as follows. When the system receives additional event (revision) to be added to document (step 702), the system first creates an event data structure 200 for the event (step 704). The system then records an identifier for the owner of the associated document in the event data structure (step 706). The system also includes the event in the list of events 308 in the associated document data structure 300 (step 708).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims

What is claimed is:

1. A computer-implemented method for controlling accesses to revisions of documents in the presence of a multi-user permissions and ownership model, comprising:

electronically receiving, on behalf of a user, a request to access a previous revision of a document that was made prior to a most-recent revision;

electronically granting access to the previous revision only if the user was the owner of the document at the time that the previous revision was made; and directing the user to the most-recent revision if the user was not the owner of the document at the time that the previous revision was made and if the user has read permissions for the document, wherein the user's permission control associated with the previous revision of the document is not available.

2. The computer-implemented method of claim 1, wherein the request is electronically received from a query processor, which can return previous and most-recent revisions of documents while electronically processing a query.

3. The computer-implemented method of claim 2, wherein prior to receiving the request to access the revision of the document, the method further comprises:

electronically receiving a query containing terms from the user;

electronically looking up the terms in previous revisions of the documents;

if terms in the query match terms in a revision of a document, electronically requesting access to the matching revision on behalf of the user; and if access is granted to the matching revision, electronically presenting the matching revision to the user.

4. The computer-implemented method of claim 1, wherein upon receiving an additional revision for a document, the method further comprises electronically storing the additional revision in data structures that contain document history information to facilitate subsequently looking up the additional revision.

5. The computer-implemented method of claim 4, wherein the additional revision is electronically stored along with an identifier for the owner of the document at the time of the additional revision.

6. The computer-implemented method of claim 1, wherein the document comprises a sequence of events, wherein each event can be associated with a revision.

7. The computer-implemented method of claim 1, wherein the permissions and ownership model is part of a file system which electronically stores files containing documents, wherein each file in the file system is associated with an owner and a set of permissions.

8. The computer-implemented method of claim 7, further comprising electronically examining permissions within the file system and using one or more authorization modules, access control lists or plug-ins to electronically authorize access to the revision.

9. A non-transitory computer-readable storage medium storing instructions that when executed by a computer cause the computer to perform a method for controlling accesses to revisions of documents in the presence of a multi-user permissions and ownership model, the method comprising:

receiving, on behalf of a user, a request to access a previous revision of a document that was made prior to a most-recent revision;

granting access to the previous revision only if the user was the owner of the document at the time that the previous revision was made; and directing the user to the most-recent revision if the user was not the owner of the document at the time that the previous revision was made and if the user has read permissions for the document, wherein the user's permission control associated with the previous revision of the document is not available.

10. The computer-readable storage medium of claim 9, wherein the request is received from a query processor, which can return previous and most-recent revisions of documents while processing a query.

11. The computer-readable storage medium of claim 10, wherein prior to receiving the request to access the revision of the document, the method further comprises:

receiving a query containing terms from the user;

looking up the terms in previous revisions of the documents;

if terms in the query match terms in a revision of a document, requesting access to the matching revision on behalf of the user; and if access is granted to the matching revision, presenting the matching revision to the user.

12. The computer-readable storage medium of claim 9, wherein upon receiving an additional revision for a document, the method further comprises storing the additional revision in data structures that contain document history information to facilitate subsequently looking up the additional revision.

13. The computer-readable storage medium of claim 12, wherein the additional revision is stored along with an identifier for the owner of the document at the time of the additional revision.

14. The computer-readable storage medium of claim 9, wherein the document comprises a sequence of events, wherein each event can be associated with a revision.

15. The computer-readable storage medium of claim 9, wherein the permissions and ownership model is part of a file system which stores files containing documents, wherein each file in the file system is associated with an owner and a set of permissions.

16. The computer-readable storage medium of claim 15, wherein the method further comprises using the permissions and ownership model within the file system and using one or more authorization modules, access control lists or plug-ins to authorize access to the revision.

17. An apparatus that controls accesses to revisions of documents in the presence of a multi-user permissions and ownership model, comprising:

a receiving mechanism configured to electronically receive, on behalf of a user, a request to access a previous revision of a document that was made prior to a most-recent revision; and an access mechanism configured to control access to the revisions of documents, wherein the access mechanism is configured to:

electronically grant access to the previous revision only if the user was the owner of the document at the time that the previous revision was made; and direct the user to the most-recent revision if the user was not the owner of the document at the time that the previous revision was made and if the user has read permissions for the document, wherein the user's permission control associated with the previous revision of the document is not available.

18. The apparatus of claim 17, wherein the request is electronically received from a query processor, which can return previous and most-recent revisions of documents while electronically processing a query.

19. The apparatus of claim 18, wherein prior to receiving the request to access the revision of the document, the query processor is configured to:

electronically receive a query containing terms from the user;

electronically look up the terms in previous revisions of the documents;

if terms in the query match terms in a revision of a document, electronically request access to the matching revision on behalf of the user; and if access is granted to the matching revision, electronically present the matching revision to the user.

20. The apparatus of claim 17, wherein upon receiving an additional revision for a document, the apparatus is configured to electronically store the additional revision in data structures that contain document history information to facilitate subsequently looking up the additional revision.

21. The apparatus of claim 20, wherein the additional revision is electronically stored along with an identifier for the owner of the document at the time of the additional revision.

22. The apparatus of claim 17, wherein the document comprises a sequence of events, wherein each event can be associated with a revision.

23. The apparatus of claim 17, wherein the permissions and ownership model is part of a file system which electronically stores files containing documents, wherein each file in the file system is associated with an owner and a set of permissions.

24. The apparatus of claim 23, wherein the access mechanism is configured to electronically examine permissions within the file system and use one or more authorization modules, access control lists or plug-ins to electronically authorize access to the revision.

* * * * *